(12) United States Patent
Koerner et al.

(10) Patent No.: US 11,283,115 B2
(45) Date of Patent: Mar. 22, 2022

(54) METHOD FOR DETERMINING A STATUS OF THE THERMAL CONNECTION OF AT LEAST ONE COMPONENT WITHIN AN ELECTRICAL ENERGY STORAGE SYSTEM TO A HEAT SOURCE OR HEAT SINK

(71) Applicant: Robert Bosch GmbH, Stuttgart (DE)

(72) Inventors: Jens Koerner, Bretzfeld-Scheppach (DE); Lars Bommer, Leonberg (DE); Marius Cichon, Ludwigsburg (DE); Matthias Rausch, Schwieberdingen (DE); Michael Donotek, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/050,483

(22) PCT Filed: Apr. 24, 2019

(86) PCT No.: PCT/EP2019/060450
§ 371 (c)(1),
(2) Date: Oct. 26, 2020

(87) PCT Pub. No.: WO2019/206953
PCT Pub. Date: Oct. 31, 2019

(65) Prior Publication Data
US 2021/0242512 A1 Aug. 5, 2021

(30) Foreign Application Priority Data
Apr. 26, 2018 (DE) ...................... 10 2018 206 487.3

(51) Int. Cl.
*H01M 10/48* (2006.01)
*H01M 10/613* (2014.01)
*H01M 10/633* (2014.01)

(52) U.S. Cl.
CPC ....... *H01M 10/486* (2013.01); *H01M 10/613* (2015.04); *H01M 10/633* (2015.04)

(58) Field of Classification Search
CPC .. H01M 10/48; H01M 10/613; H01M 10/633; H01M 10/63; H01M 10/486; H01M 10/6556; Y02E 60/10
See application file for complete search history.

(56) References Cited

U.S. PATENT DOCUMENTS

| 9,748,537 | B2* | 8/2017 | Emori | B60L 58/24 |
| 2012/0171543 | A1* | 7/2012 | Hirsch | H01M 10/647 |
| | | | | 429/120 |
| 2014/0050951 | A1* | 2/2014 | Fleckenstein | H01M 10/633 |
| | | | | 429/62 |

FOREIGN PATENT DOCUMENTS

| DE | 102011007840 | 10/2012 |
| DE | 102016225508 | 6/2018 |

(Continued)

OTHER PUBLICATIONS

International Search Report for Application No. PCT/EP2019/060450 dated Jul. 24, 2019 (English Translation, 2 pages).

*Primary Examiner* — Alexander Usyatinsky
(74) *Attorney, Agent, or Firm* — Michael Best & Friedrich LLP

(57) ABSTRACT

The invention relates to a method for determining a status of a thermal connection of at least one component within an electrical energy storage system to a heat source or heat sink, wherein the electrical energy storage system has at least one electrical energy storage unit, comprising the following steps: a) determining (S11) a temperature of the at least one component; b) determining (S12) a temperature of the heat source or heat sink, in particular a cooling plate; and c) determining (S13) the status of the thermal connection of the at least one component to the heat source or heat sink based (Continued)

on the temperature of the at least one component and the temperature of the heat source or heat sink. The invention also relates to a corresponding device and a corresponding electrical energy storage system.

11 Claims, 4 Drawing Sheets

(56) References Cited

FOREIGN PATENT DOCUMENTS

| | | |
|---|---|---|
| EP | 2634028 | 9/2013 |
| EP | 3043417 | 7/2016 |

* cited by examiner

METHOD FOR DETERMINING A STATUS OF THE THERMAL CONNECTION OF AT LEAST ONE COMPONENT WITHIN AN ELECTRICAL ENERGY STORAGE SYSTEM TO A HEAT SOURCE OR HEAT SINK

BACKGROUND OF THE INVENTION

The present invention is based on a method for the ascertainment of a status of the thermal connection of at least one component within an electrical energy storage system to a heat source or heat sink.

In the course of the increasing electrification of, in particular, motor vehicles, electrical energy stores and further components necessary for their operation, for example a cooling circuit, are becoming ever more important. In the operation of these electrical energy stores, particular attention is paid to the least possible ageing, which, for example, means the smallest possible loss of capacity, or the smallest possible increase in the internal resistance. The safety of the electrical energy stores furthermore is paramount. This, for example, involves protecting the electrical energy stores from too much warming, or even overheating, or preventing these through suitable cooling measures.

If, for example, adequate cooling of an electrical energy store is no longer possible, for example because the thermal connection between a cooling medium and the electrical energy stores has deteriorated, this can result in faster ageing, or even to what is known as thermal runaway, an overheating of the electrical energy store with the formation of gas. A deterioration in the thermal connection can, for example, be caused by ageing of what is known as the thermal interface material, which is, for example, introduced between the electrical energy store and a heat sink in order to improve the thermal contact there and, furthermore, to ensure electrical insulation.

No methods are known from the prior art that permit a corresponding detection of a deterioration of the thermal connection and, if relevant, a precise localization of the damage location.

SUMMARY OF THE INVENTION

A method for the ascertainment of a status of the thermal connection of at least one component to a heat source or heat sink within an electrical energy storage system.

The electrical energy storage system here comprises at least one electrical energy storage unit. A temperature of the at least one component is ascertained. This can, for example, take place by means of a temperature sensor attached to the component.

A temperature of the heat source or of the heat sink is furthermore ascertained. This can, for example, take place by means of a temperature sensor attached in and/or at the heat sink or heat source. A thermodynamic heat balancing can furthermore also be carried out, in order to ascertain the temperature of the heat sink or heat source. The heat source or heat sink can, for example, be a cooling plate through which a cooling medium, for example a cooling liquid, in particular a water-glycol mixture, flows.

The status of the thermal connection of the at least one component is then ascertained on the basis of the temperature of the at least one component and of the temperature of the heat source or heat sink. This is advantageous, since it is in this way established whether the thermal connection is adequate for a safe operation of the electrical energy storage system. This yields the advantage in appropriate cases of carrying out corresponding rectification measures in good time, for example visiting a workshop that performs corresponding repair work on the electrical energy storage system. The status of the thermal connection can, for example, be characterized by a thermal resistance value and/or a thermal conductance value which has a predefined value when newly shipped, or is located within a predefined range of values. If, for example, an ascertained thermal resistance value deviates from the predefined value, or is not located within the predefined range of values, the status of the thermal connection is classified as no longer sufficient for the requirements. As an alternative, a difference of the two ascertained temperatures is determined after which, if a predefined temperature difference limit value is exceeded, the status of the thermal connection is classified as no longer adequate for the requirements.

Advantageously, if the thermal connection of the at least one component to the heat source or to the heat sink ascertained is inadequate, or does not correspond to the requirements, or is insufficient, the electrical power, for example the maximum retrievable power, or the maximum power retrievable over a predefined period of time, in particular the current retrievable from the electrical energy storage system, for example a maximum value of the retrievable current or the maximum retrievable current over a predefined period of time, is reduced in such a way that an at least restricted continued operation of the electrical energy storage system is enabled.

Expediently the at least one component comprises the at least one electrical energy storage unit of the electrical energy storage system, or the at least one component is the at least one electrical energy storage unit of the electrical energy storage system. This is advantageous, since the electrical energy storage unit is usually the component that is subject to a strong heating and therefore requires a good thermal connection to a heat sink for heat dissipation. It is also advantageous if heat has to be supplied to the electrical energy storage unit. The component can, however, also comprise a connecting element of two or more electrical energy storage units.

Expediently a fluid flows through the heat source or the heat sink. Where appropriate this fluid can be a liquid. This is advantageous, since an effective cooling or heating of the electrical energy storage unit is thereby achieved.

Expediently the ascertainment of the temperature of the component comprises an acquisition of the temperature of the component and/or the ascertainment of the temperature of the heat source or heat sink comprises an acquisition of the temperature of the heat source or heat sink. As described, this acquisition can take place by means of an appropriately attached temperature sensor, for example by means of a thermocouple. This has the advantage that the temperature of the component or of the heat source or heat sink is acquired directly, and an accurate ascertainment of the temperature is thus enabled.

Expediently, the ascertainment of the temperature of the component takes place by means of a first mathematical model that simulates a heat development of the component. This has the advantage that, where relevant, the temperature of the component can be ascertained even without a temperature sensor. The accuracy of the temperature ascertainment is furthermore increased in an advantageous manner through simultaneous use of the temperature sensor and of the first mathematical model.

Expediently the status of the thermal connection is ascertained by means of a second mathematical model that simulates a thermal path from the component to the heat source or heat sink. The ascertainment of the status of the thermal connection is thereby advantageously improved, which permits a more accurate and, where applicable, earlier detection of weak sites in the thermal connection.

A warning is expediently displayed if a predefined limit status of the thermal connection is exceeded or undershot, and/or the electrical energy storage system is operated at reduced power. A predefined limit status can, for example, be characterized by a predefined thermal resistance value and/or by a predefined temperature difference between the at least one component and the heat source or heat sink. If, for example, the status of the thermal connection is ascertained by means of the second mathematical model, and it emerges from this ascertainment that a thermal resistance exceeds a predefined thermal resistance limit value, this signifies that the thermal connection is poor. A predefined limit status is thus exceeded. This is advantageous, since as a result damage to the electrical energy storage system or to the component resulting from an excessively high temperature rise can be prevented. If the electrical energy storage system is operated with reduced electrical power, less thermal power is lost, whereby, for example, an overheating of the component is prevented. The display of a warning gives a user of the electrical energy storage system the option, if relevant, of visiting a workshop or of stopping operation of the electrical energy storage system.

Expediently the energy storage system comprises a plurality of electrical energy storage units and at least one cooling plate as a heat sink or heat source. Temperatures are ascertained for at least two of the plurality of electrical energy storage units, preferably for each of the plurality of electrical energy storage units. Temperatures are furthermore ascertained for or at multiple different positions of the cooling plate. The status of the thermal connection is ascertained on the basis of the ascertained temperatures of the electrical energy storage units and of the temperatures of the cooling plate ascertained for or at multiple different positions of the cooling plate. This has the advantage that, in addition to the above-mentioned advantages, a localization can be carried out of a site with poor thermal connection of an electrical energy storage unit to the cooling plate. A possible repair can thereby be carried out in an accurately located and plannable manner.

Expediently, the ascertained temperatures of the at least two of the plurality of electrical energy storage units and the temperatures of the cooling plate ascertained for or at multiple different positions of the cooling plate are compared to one another, so that a position-dependent ascertainment of the status of the thermal connection is carried out. This has the advantage that a damaged site can be localized rapidly through the comparison of the temperatures with one another.

An electrical energy storage system that comprises at least one electrical energy storage unit and one heat sink or heat source as well as at least one means, wherein the means is configured to carry out the steps of the disclosed method, is furthermore an object of the disclosure. The at least one means can here in particular be an electronic battery management control device. This has the advantage that the above-mentioned advantages are realized.

The at least one means can, for example, comprise a battery management control device as well as current sensors and/or voltage sensors and/or temperature sensors, for example thermocouples. An electronic control unit, in particular embodied as a battery management control device, can also be such a means. An electronic control unit can in particular refer to an electronic control device that, for example, comprises a microcontroller and/or an application-specific hardware component, for example an ASIC, but a personal computer or a programmable logic controller can however also be intended.

The electrical energy storage system expediently comprises a plurality of electrical energy storage units and a cooling plate with a plurality of spatially distributed temperature sensors, wherein the at least one means is furthermore configured to carry out the corresponding method steps mentioned above. The advantages mentioned in respect of the corresponding method steps are thus realized.

An electrical energy storage unit can, in particular, refer to an electrochemical battery cell and/or a battery module with at least one electrochemical battery cell and/or a battery pack with at least one battery module. The electrical energy storage unit can, for example, be a lithium-based battery cell or a lithium-based battery module or a lithium-based battery pack. The electrical energy storage unit can, in particular, be a lithium-ion battery cell or a lithium-ion battery module or a lithium-ion battery pack. The battery cell can, furthermore, be of the lithium-polymer accumulator, nickel-metal hydride accumulator, lead-acid accumulator, lithium-air accumulator or lithium-sulfur accumulator type, or, quite generally, an accumulator of any electrochemical composition. A capacitor is also possible as an electrical energy storage unit.

BRIEF DESCRIPTION OF THE DRAWINGS

Advantageous forms of embodiment of the invention are represented in the figures and described in more detail in the following description.

Here.

DETAILED DESCRIPTION

In all the figures, the same reference signs identify identical device components or identical methods steps.

Figure 1:
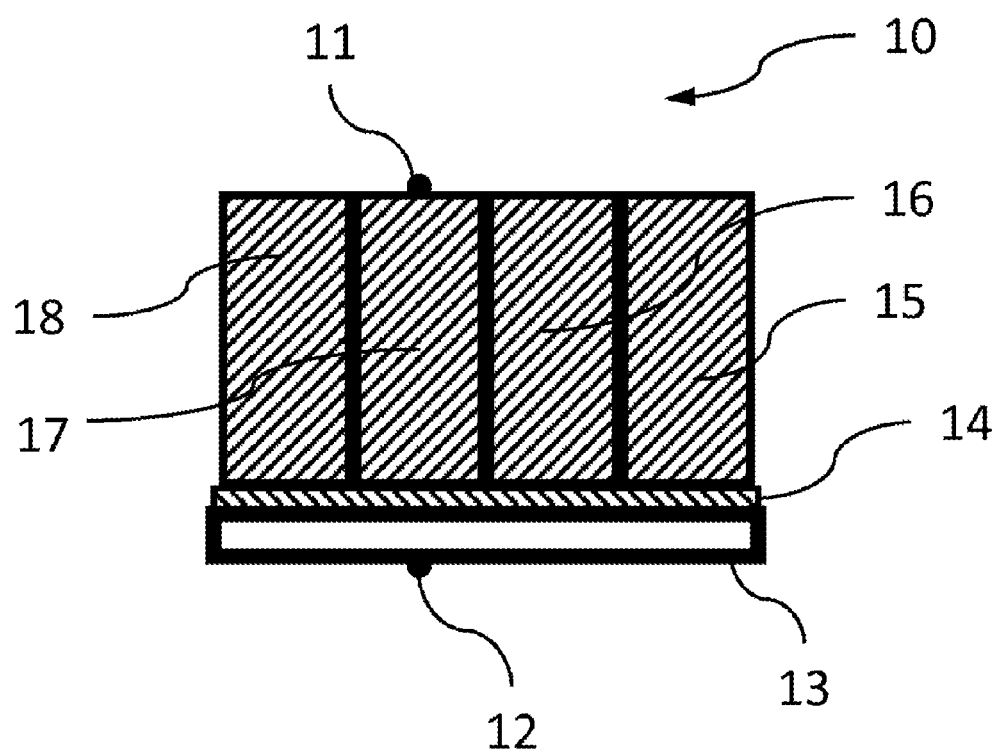
FIG. 1 shows a schematic cross-sectional view of the disclosed electrical energy storage system according to one form of embodiment.

FIG. 1 shows a schematic cross-sectional illustration of the disclosed electrical energy storage system 10 according to one form of embodiment. The electrical energy storage system 10 here comprises a first temperature sensor 11 which is attached in FIG. 1 in the region of the pole terminals of the third electrical energy storage unit 17, and serves for ascertainment of a temperature of the electrical energy storage unit. The electrical energy storage system 10 furthermore comprises a first electrical energy storage unit 15, a second electrical energy storage unit 16 and a fourth electrical energy storage unit 18. The first temperature sensor 11 can, for example, also be attached between the first electrical energy storage unit 15 and the second electrical energy storage unit 16 and be located in the wall contact region between the two electrical energy storage units. Between the electrical energy storage units 15, 16, 17, 18 and a cooling plate 13, which acts as a heat source or heat sink, what is known as a thermal interface material 14 is located, which on the one hand compensates for surface differences or roughnesses and on the other hand acts as an electrical insulation between the electrical energy storage units 15, 16, 17, 18 and the cooling plate 13. A second temperature sensor 12 is attached to the cooling plate 13 on the side that faces away from the thermal interface material 14, said sensor serving for ascertainment of a temperature of the cooling plate. The second temperature sensor 12 can, for example, also be attached on the side that faces the thermal interface material 14, or it can also be attached inside the cooling plate 13.

Figure 2:
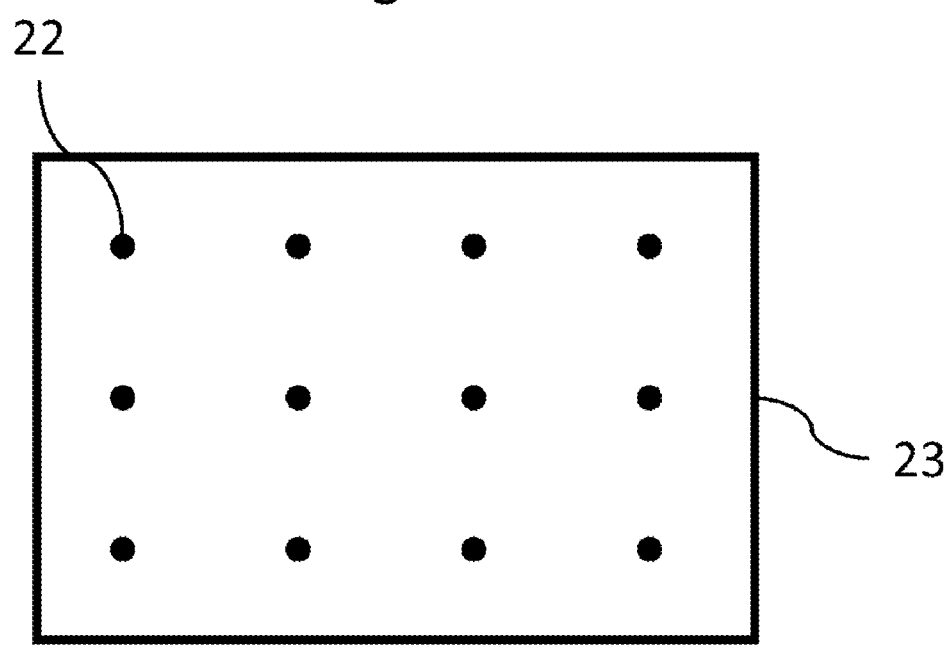
FIG. 2 shows a schematic illustration of an underside of the disclosed cooling plate with a plurality of spatially distributed temperature sensors.

FIG. 2 shows a schematic illustration of an underside of the disclosed cooling plate 23 with a plurality of spatially distributed temperature sensors 22. Alternatively, as described above, the temperature sensors 22 can also be attached to the upper side. Preferably, the temperature sensors 22, as illustrated in FIG. 2, are attached at equal distances from one another; alternatively the distance in a first direction of extension can be different from the distance in a second direction of extension that runs perpendicularly to the first direction of extension. The attachment of the temperature sensors 22 can be done in such a way that one temperature sensor 22 on the cooling plate 23 is assigned to one electrical energy storage unit. In plan view, one temperature sensor 22 is thus located on the projection surface of the corresponding electrical energy storage unit. Alternatively, the temperature sensors 22 can also be attached on the upper side of the cooling plate 23.

Figure 3:
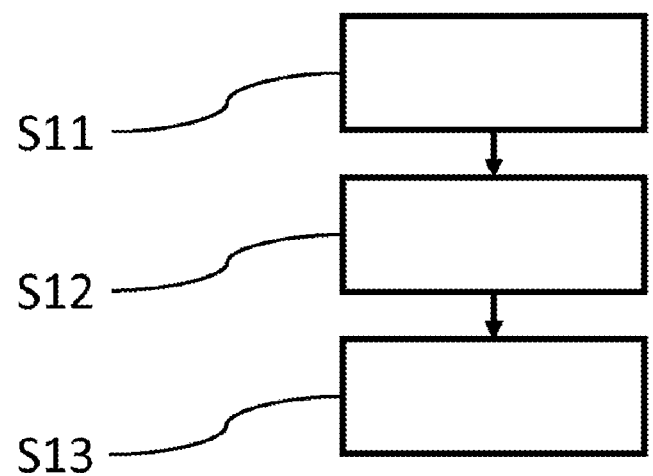
FIG. 3 shows a flow diagram of the disclosed method according to a first form of embodiment.

FIG. 3 shows a flow diagram of the disclosed method according to a first form of embodiment. In a first step S11, a temperature of a component within an electrical energy storage system is ascertained. This can, for example, be done by means of a temperature sensor attached at or in the component, as is shown in FIG. 1. In a second step S12, a temperature of a heat sink is ascertained. This can, for example, be done by means of a temperature sensor attached at or in the heat sink, as is shown in FIG. 1. The sequence of the first step S11 and the second step S12 can also be reversed. In a third step S13, a status of the thermal connection of the component to the heat sink is then ascertained on the basis of the temperature of the component and of the temperature of the heat sink, in that a temperature difference between the two ascertained temperatures is determined and the status of the thermal connection is determined with reference to the temperature difference.

Figure 4:
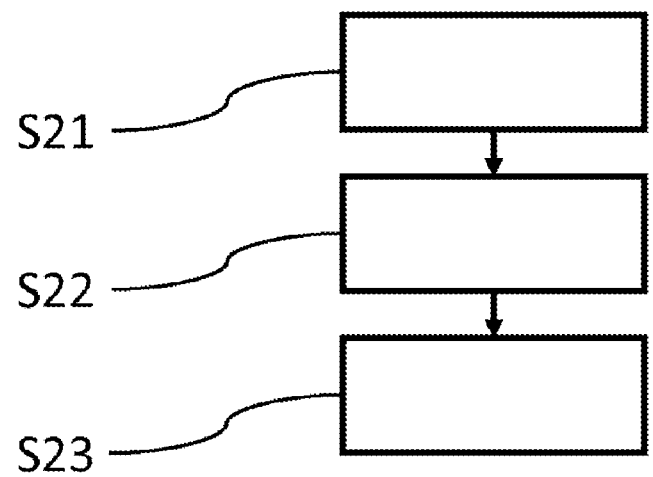
FIG. 4 shows a flow diagram of the disclosed method according to a second form of embodiment.

FIG. 4 shows a flow diagram of the disclosed method according to a second form of embodiment. In a first step S21, a temperature of an electrical energy storage unit within an electrical energy storage system is acquired, for example by means of a first temperature sensor, and its temperature thereby ascertained. In a second step S22, a temperature of a heat source within the electrical energy storage system is acquired, for example by means of a second temperature sensor, and its temperature thereby ascertained. After this, in a third step S23, a status of a thermal connection of the electrical energy storage unit to the heat source is ascertained, in that a thermal resistance value characteristic for the thermal connection is ascertained, and this characteristic thermal resistance value is compared with a predefined thermal resistance limit value. If the ascertained thermal resistance value is greater than the predefined thermal resistance limit value, the thermal connection of the electrical energy storage unit to the heat source no longer corresponds to the requirements and should be monitored in order to avoid possible damage.

Figure 5:
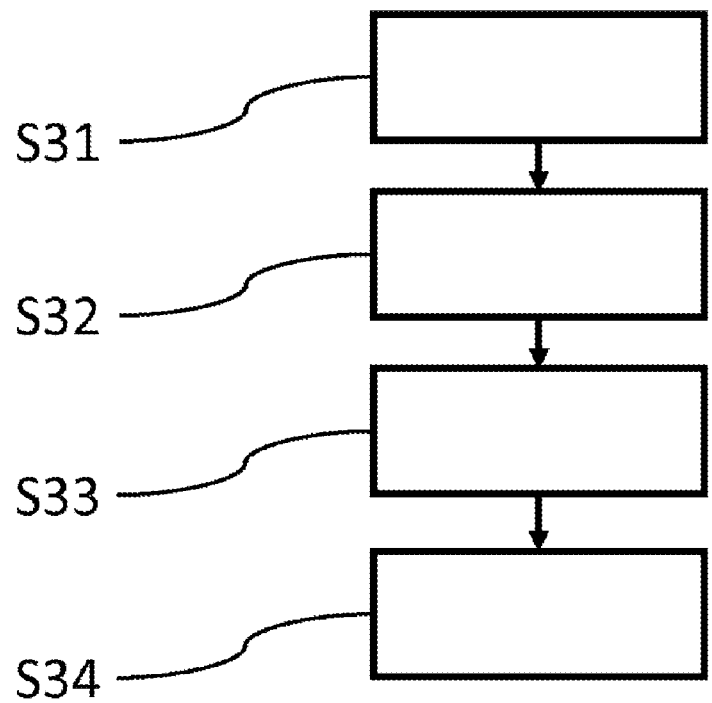
FIG. 5 shows a flow diagram of the disclosed method according to a third form of embodiment.

FIG. 5 shows a flow diagram of the disclosed method according to a third form of embodiment. In a first step S31, a first temperature of an electrical energy storage unit within an electrical energy storage system is acquired. In a second step S32, the first temperature thus acquired is used in a first mathematical model and a second temperature of the electrical energy storage unit is ascertained by means of the first mathematical model and of the acquired first temperature. In a third step S33, a temperature of a cooling plate within the electrical energy storage system is acquired. Both the second temperature of the electrical energy storage unit and the temperature of the cooling plate, at least at the point of the temperature acquisition of the cooling plate, are thus known. In a fourth step S34, the status of the thermal connection of the electrical energy storage unit to the cooling plate is then ascertained by means of a second mathematical model, wherein the second mathematical model simulates a thermal path from the electrical energy storage unit to the cooling plate. The second mathematical model with the thermal path is used within the ascertainment step to estimate the temperature of the cooling plate, at least at the point of the above-mentioned temperature acquisition of the cooling plate, making use of the second temperature of the electrical energy storage unit. If the temperature of the cooling plate estimated by means of the second mathematical model differs from the temperature acquired in the third step S23 by more than a predefined temperature difference limit value, the status of the thermal connection is classified as unsatisfactory.

Figure 6:
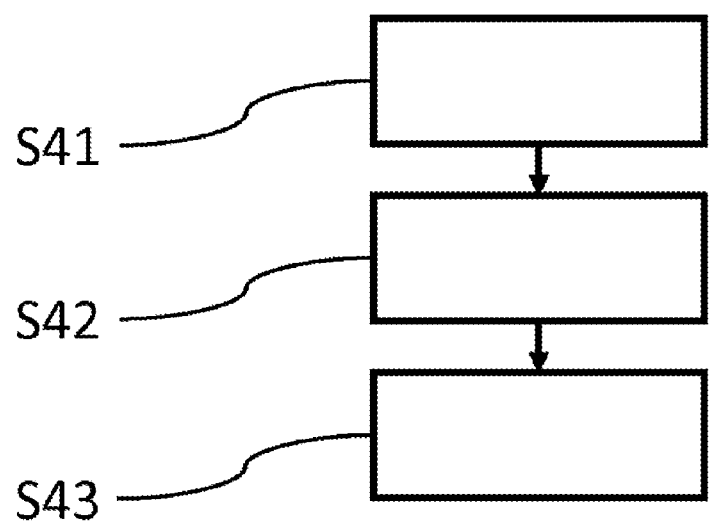
FIG. 6 shows a flow diagram of the disclosed method according to a fourth form of embodiment.

FIG. 6 shows a flow diagram of the disclosed method according to a fourth form of embodiment. Here, the electrical energy storage system comprises a plurality of electrical energy storage units and a cooling plate. In a first step S41, the temperatures of the plurality of electrical energy storage units are ascertained, for example as has been described above. In a second step S42, temperatures are ascertained at multiple different sites of the cooling plate, for example by means of a plurality of temperature sensors which, as is illustrated in FIG. 2, are attached to the cooling plate. In a third step S43, an ascertainment of the position-dependent status of the thermal connection is then carried out through a comparison of the ascertained temperatures of the electrical energy storage units with one another. This comparison can, for example, show that one temperature ascertained at one electrical energy storage unit differs by more than a first permissible, predefined temperature difference limit value from the adjacent temperatures ascertained. The comparison of an ascertained temperature thus preferably is performed with the temperatures ascertained at adjacent electrical energy storage units, since at these positions identical or very similar thermal conditions can justifiably be assumed. The temperatures that have been ascertained at multiple different sites of the cooling plate can furthermore be compared with one another. As described above, temperatures ascertained at adjacent positions are preferably compared with one another and if a second permissible, predefined temperature difference limit value is exceeded, and/or if the first permissible, predefined temperature difference limit value is exceeded, the status of the thermal connection at the corresponding position is classified as unsatisfactory.

Figure 7:
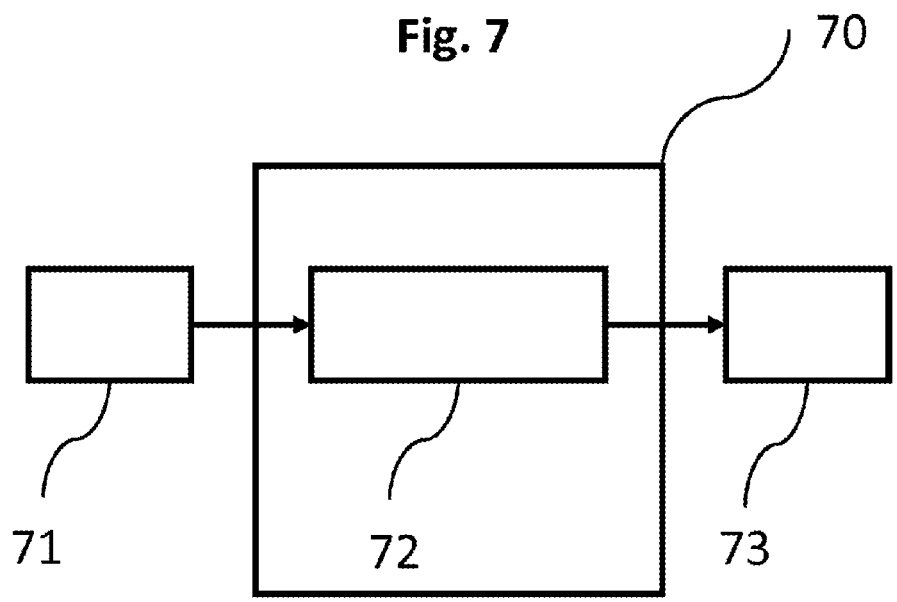
FIG. 7 shows a schematic illustration of the disclosed device according to one form of embodiment.

FIG. 7 shows a schematic illustration of the disclosed device 70 according to one form of embodiment. The device 70 here comprises a battery management control device 72.

Various sensors 71, for example temperature sensors and current sensors, are furthermore connected to the battery management control device. The device 70 can, for example, also comprise the sensors 71, in particular the temperature sensors. In order to reduce or to limit the power or the current that can be retrieved from the electrical energy storage system, the battery management control device appropriately controls power electronics 73, for example an inverter.

The invention claimed is:

1. A method for the ascertainment of a status of a thermal connection of at least one component within an electrical energy storage system to a heat source or heat sink, wherein the electrical energy storage system comprises a plurality of electrical energy storage units, the method comprising:
 a) ascertaining a temperature of the at least one component for at least two of the plurality of electrical energy storage units;
 b) ascertaining a temperature of the heat source or heat sink at multiple different positions of the heat source or heat sink; and
 c) ascertaining the status of the thermal connection of the at least one component to the heat source or heat sink on the basis of the temperatures of the at least one component and of the temperatures of the heat source or heat sink.

2. The method as claimed in claim 1, wherein the at least one component comprises the at least one electrical energy storage unit of the electrical energy storage system.

3. The method as claimed in claim 1, wherein a fluid flows through the heat source or the heat sink.

4. The method as claimed in claim 1, wherein the ascertainment of the temperature of the component in step a) comprises an acquisition of the temperature of the component and/or the ascertainment of the temperature of the heat source or heat sink in step b) comprises an acquisition of the temperature of the heat source or heat sink.

5. The method as claimed in claim 1, wherein the ascertainment of the temperature of the component in step a) takes place by means of a first mathematical model that simulates a heat development of the component.

6. The method as claimed in claim 1, wherein in step c) the ascertainment of the status of the thermal connection takes place by means of a second mathematical model that simulates a thermal path from the component to the heat source or heat sink.

7. The method as claimed in claim 1, further comprising:
 d) display of a warning and/or operation of the electrical energy storage system at reduced power if a predefined limit status of the thermal connection is exceeded or undershot.

8. The method as claimed in claim 1, wherein a position-dependent ascertainment of the status of the thermal connection is carried out by means of comparing the ascertained temperatures with one another.

9. A device for the ascertainment of a status of the thermal connection of at least one electrical energy storage unit within an electrical energy storage system to a heat source or heat sink, wherein the electrical energy storage system comprises a plurality of electrical energy storage units comprising an electronic battery management control device that is programmed to:
 ascertain a temperature of the at least one component for at least two of the plurality of electrical energy storage units;
 ascertain a temperature of the heat source or heat sink at multiple different positions of the heat source or heat sink; and
 ascertain a status of a thermal connection of the at least one component to the heat source or heat sink on the basis of the temperatures of the at least one component and of the temperatures of the heat source or heat sink.

10. An electrical energy storage system comprising:
 a plurality of electrical energy storage units;
 a heat sink or heat source; and
 electronic battery management control device that is programmed to:
  ascertain a temperature of the at least one component for at least two of the plurality of electrical energy storage units;
  ascertain a temperature of the heat source or heat sink at multiple different positions of the heat source or heat sink; and
  ascertain a status of a thermal connection of the at least one component to the heat source or heat sink on the basis of the temperatures of the at least one component and of the temperatures of the heat source or heat sink.

11. An electrical energy storage system as claimed in claim 10, comprising a plurality of electrical energy storage units, wherein the heat sink or heat source comprises a cooling plate with a plurality of spatially distributed temperature sensors.

* * * * *